United States Patent [19]

Wang et al.

[11] Patent Number: 5,748,330
[45] Date of Patent: May 5, 1998

[54] METHOD OF CALIBRATING A DIGITAL PRINTER USING COMPONENT TEST PATCHES AND THE YULE-NIELSEN EQUATION

[75] Inventors: Shen-ge Wang, Fairport, N.Y.; Charles M. Hains, Altadena, Calif.

[73] Assignee: Xerox Corporation, Stamford, Conn.

[21] Appl. No.: 850,462

[22] Filed: May 5, 1997

[51] Int. Cl.⁶ .............. H04N 1/40; H04N 1/46; G06K 9/36
[52] U.S. Cl. .......... 358/298; 358/406; 358/448; 358/504; 382/252
[58] Field of Search .................. 358/298, 406, 358/448, 454, 456–459, 500–502, 504, 530–536; 395/109; 382/205, 251, 252, 254, 308, 312, 319

[56] References Cited

U.S. PATENT DOCUMENTS

| | | | |
|---|---|---|---|
| 4,706,206 | 11/1987 | Benoit et al. | 364/526 |
| 4,717,954 | 1/1988 | Fujita et al. | 358/80 |
| 5,224,421 | 7/1993 | Doherty | 101/211 |
| 5,293,539 | 3/1994 | Spence | 358/527 |
| 5,333,069 | 7/1994 | Spence | 358/517 |
| 5,357,448 | 10/1994 | Stanford | 364/526 |
| 5,402,253 | 3/1995 | Seki | 358/518 |
| 5,469,267 | 11/1995 | Wang | 358/298 |
| 5,469,515 | 11/1995 | Lin | 382/237 |
| 5,543,941 | 8/1996 | Parker et al. | 358/534 |
| 5,596,425 | 1/1997 | Usui et al. | 358/500 |
| 5,649,073 | 7/1997 | Knox et al. | 358/298 X |

OTHER PUBLICATIONS

"Novel Centering Method for Overlapping Correction in Halftoning," (Proceedings of IS&T, 47th Annual Conference, 1994, pp. 482–486).

*Primary Examiner*—Eric Frahm
*Attorney, Agent, or Firm*—R. Hutter

[57] ABSTRACT

A technique for calibrating the hardware and software of a digital printing apparatus relies on making seven component test patches which completely characterize the printing system, and then measuring the actual reflectance of these seven test patches. The measured reflectances are then converted, by the Yule-Nielsen equation, to values representative of the ink area coverage characteristic of each component test patch, because ink area coverage is the parameter that can be directly controlled by the digital printer. This conversion step takes into account the nonlinear relationship between the reflectance of a halftone area and the amount of ink area coverage on the halftone area.

7 Claims, 3 Drawing Sheets

| 75 | 80 | 200 | 105 | 175 | 125 |
|---|---|---|---|---|---|
| 180 | 190 | 200 | 190 | 180 | 175 |
| 175 | 125 | 100 | 125 | 175 | 200 |
| 175 | 125 | 160 | 160 | 100 | 175 |
| 100 | 75 | 200 | 200 | 160 | 75 |

| P4 | P5 | P5 | P5 | P5 | P5 |
|---|---|---|---|---|---|
| P5 | P4 | P4 | P5 | P6 | P6 |
| P3 | P1 | P4 | P2 | P5 | P6 |
| P1 | P3 | P6 | P5 | P2 | P5 |
| P4 | P5 | P6 | P6 | P5 | P5 |

| 75 | 80 | 200 | 105 | 175 | 125 |
| --- | --- | --- | --- | --- | --- |
| 180 | 190 | 200 | 190 | 180 | 175 |
| 175 | 125 | 100 | 125 | 175 | 200 |
| 175 | 125 | 160 | 160 | 100 | 175 |
| 100 | 75 | 200 | 200 | 160 | 75 |
*FIG. 3A*
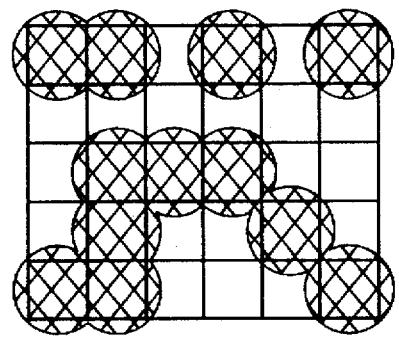
*FIG. 3B*
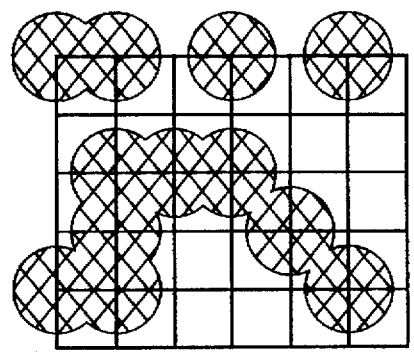
*FIG. 3C*
| P4 | P5 | P5 | P5 | P5 | P5 |
| --- | --- | --- | --- | --- | --- |
| P5 | P4 | P4 | P5 | P6 | P6 |
| P3 | P1 | P4 | P2 | P5 | P6 |
| P1 | P3 | P6 | P5 | P2 | P5 |
| P4 | P5 | P6 | P6 | P5 | P5 |
*FIG. 3D*

METHOD OF CALIBRATING A DIGITAL PRINTER USING COMPONENT TEST PATCHES AND THE YULE-NIELSEN EQUATION

INCORPORATION BY REFERENCE

The following U.S. patent is hereby incorporated by reference: U.S. Pat. No. 5,469,267, by one of the inventors hereof.

FIELD OF THE INVENTION

The present invention relates to a method for calibrating a digital printer, such as an electrophotographic or ink-jet printer, to achieve halftone areas of a specific desired reflectance.

BACKGROUND OF THE INVENTION

Digital halftoning is a process in which digital input signals to a digital printer are modified prior to printing a hard copy, such that a digitally printed version of a photographic image creates the illusion of the continuous tone scale of the photographic original. Most ink-jet printers and electrophotographic "laser" printers ultimately operate in a binary mode, i.e., a printed dot is either present or absent on a two-dimensional medium (sheet) at a specified location. Thus, due to the binary nature of such printers, a true continuous tone reproduction of a photographic image is not possible with digital printers. However, in order to approach the appearance of continuous tone, the digital input signals are modified prior to printing so as to direct the digital printer to spatially distribute fewer or more printed dots in the neighborhood or vicinity of a designated dot, thereby increasing or decreasing the distribution of printed dots about a designated area on the print. As is known in the art, techniques for controlling the distribution of dots to a obtain the illusion of continuous tones can be classified as either "halftone screen" techniques, in which small dots are accumulated to make larger dots of specified sizes, or "error diffusion" techniques, in which the presence or absence of a dot in a particular location responsive to original digital data is used to derive an error signal, and this error signal is essentially spatially distributed in the neighborhood of the dot, to determine whether other dots will be placed near the dot.

U.S. Pat. No. 5,469,267, by the inventor hereof and incorporated by reference above, sets forth a technique which can be used to enhance and simplify any kind of halftoning technique. In brief, according to the patent, any distribution of dots on a sheet is effectively superimposed on a grid of contiguous squares, wherein the corners formed by the squares are centered on the dots. This is in contrast to prior-art systems, in which the dots are superimposed on a pattern of squares with the dots centered in the middle of each square. The advantage of using a grid which has corners centered on the dots are: (1) only seven characteristic patterns are required to characterize an entire digital printing system, and (2) the amount of overlap of neighboring dots, which will directly affect the reflectance of the total halftone area, can be taken into account.

In designing a system for creating precise and accurate halftone based on digital image data, one subtlety that must be taken into account is the difference between the "reflectance" of an area of halftone on a sheet and the "ink area coverage" of the area, by which is meant the proportion, purely in surface area terms of the sheet which is covered by ink or other colorant such as toner. While reflectance is the property of interest to a viewer of the finished image, a digital printer can only directly control the ink area coverage, because the only variable the printer can affect is the amount of ink or toner placed on the sheet. Ideally, there should be an exact or at least linear relationship between the ink area coverage on a sheet and the reflectance thereof (e.g., a white sheet having 50% of its area covered with black ink should have a reflectance of 50%), in practical situations this relationship is never so neat.

One well-known equation for establishing a relationship between the ink area coverage on a sheet and the reflectance of the image created on the sheet is known as the "Yule-Nielsen equation." As will be described in detail below, the Yule-Nielsen equation states the relationship between ink area coverage and perceived reflectance. Basically, two major factors which influence the non-linearity between ink area coverage and perceived reflectance are (a) the fact that dots in a halftoning system tend to overlap, and this overlap cancels out a proportion of ink area coverage for each dot, and (b) the light transmissivity of the paper or other medium.

The present invention is a technique which exploits both the centered-dot calibration technique of the '267 patent and the Yule-Nielsen equation to provide a calibration technique for digital printers which is both simple and highly accurate.

DESCRIPTION OF THE PRIOR ART

U.S. Pat. No. 4,706,206 describes a calibration technique for a multi-color printing process in which measurements of the optical density of two different three-color halftone control areas are used to calculate separately the dot gain in solid density of the cyan, magenta, and yellow images. This technique to some extent exploits Yule-Nielsen relationships.

U.S. Pat. No. 4,717,954 discloses another use of Yule-Nielsen relationships to aid in calibrating a full-color printer.

U.S. Pat. No. 5,224,421 discloses another technique for adjusting color controls in a printing press. Density spectra from a test sheet and a printed product are expressed as a linear combination of density spectra of individual CMY process colors and the density spectrum of the color of the color of the paper multiplied by fractions, the fractions being calculated so that the density spectra are approximated through the linear combination.

U.S. Pat. No. 5,357,448 discloses a feedback system for obtaining colors in a digital printer, incorporating a modified form of Neugebauer's model.

U.S. Pat. Nos. 5,333,069 and 5,293,539 each disclose methods for providing an accurate appearance match between two depictions of a common image produced by two imaging systems, or providing accurate tone reproduction in an output image in terms of dot gain curve shape and scale.

U.S. Pat. No. 5,402,253 discloses using Yule-Nielsen relations to perform undercolor removal to substitute black colorant for combinations of cyan, magenta, and yellow colorant in a digital printer.

U.S. Pat. No. 5,469,515 discloses a method of generating a halftone image from a grayscale image using a dither matrix. The halftone image is represented by symbols when it is printed out by the printer. Each pattern has many elements having values with a different number of 1's and 0's, and the values of the elements in each pattern depend on a model of the symbols.

U.S. Pat. No. 5,543,941 discloses a method for a halftone rendering of a grayscale image by filtering the original image through a blue noise mask.

U.S. Pat. No. 5,596,425 discloses a printer calibration system where the luminance of reflected light from a test print is expressed by a linear combination of the luminance of specular reflection light and that of internal reflection light.

The article "Novel Centering Method for Overlapping Correction in Halftoning," (Proceedings of IS&T, 47th Annual Conference, 1994, pp. 482–486), of which one of the present inventors is a co-author, expands on the disclosure in the patent incorporated by reference. Further the article describes the application of the centered-dot concept to error diffusion halftoning.

SUMMARY OF THE INVENTION

According to one aspect of the present invention, there is provided a method of calibrating a digital printer. The digital printer is caused to print a set of component test patches on a sheet, with each component test patch representing a unique repetitive pattern of dots relative to a grid. The reflectance of each component test patch is measured, and a relationship is derived between a measured reflectance of each component test patch and an area of ink coverage of each component test patch. Image data operative of the digital printer to create a halftone area of a desired reflectance according to halftone technique is created. This image data is parsed as a composite of small areas, each small area being associated with a component test patch. A reflectance associated with the halftone area is determined, based on summing a derived area of ink coverage of each small area forming the halftone area.

BRIEF DESCRIPTION OF THE DRAWINGS

FIGS. 3A–3D illustrate steps by which the method of the present invention can be applied to calibrating a halftone-screening technique.

DETAILED DESCRIPTION OF THE INVENTION

Figure 1:
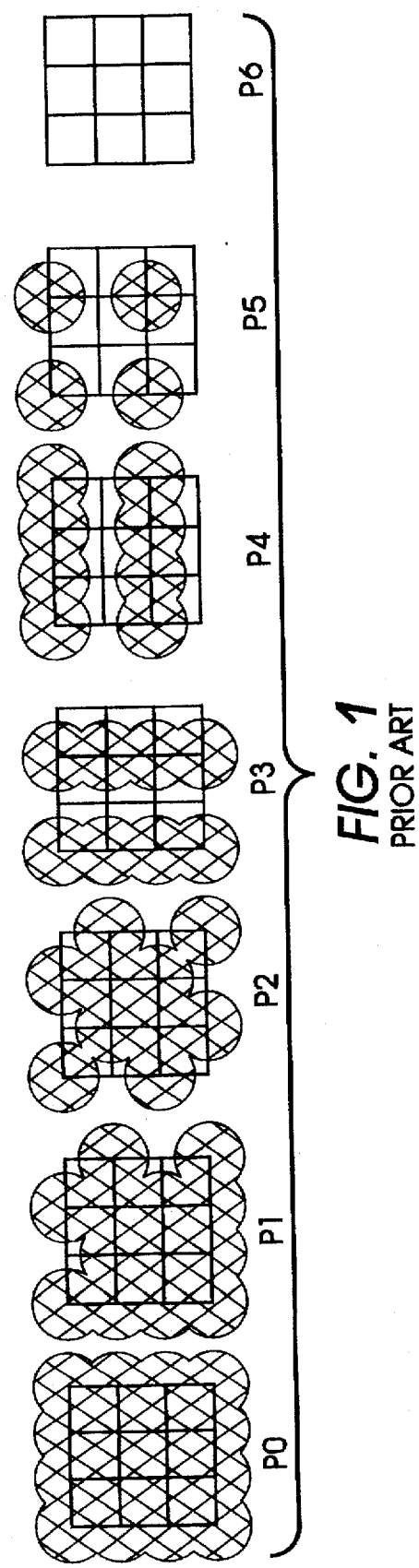
FIG. 1 is a set of example portions of test patches useable according to the method of the present invention.
Figure 2:
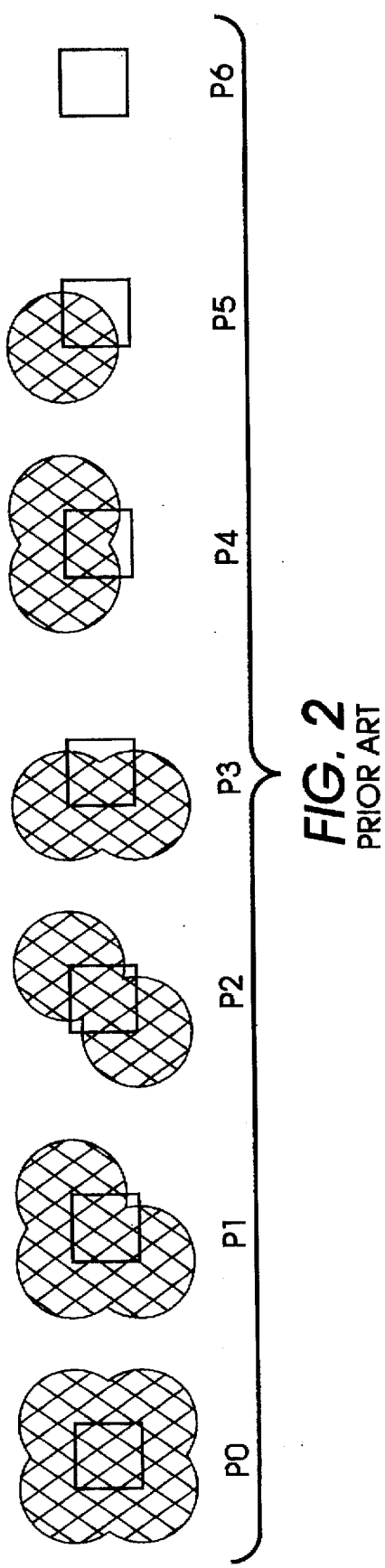
FIG. 2 is a set of smaller portions of the test patches shown in FIG. 1, on the level of an individual cell in the grid superimposed on each of the test patches.

FIGS. 1 and 2 are examples of test-patch sets which are preferably used according to the method of the present invention. A detailed description of these test patches is given in the patent incorporated by reference, and here follows only a brief discussion thereof.

The test patches marked P0–P6 in FIG. 1 represent a series of test patches preferably used with the present invention, with a portion of a grid (not part of the test patch) superimposed on each. The grid is a two-dimensional array of squares, with the corners of the squares aligned over the centers of the round dots which form the dark areas of the image. As is known in the art of digital printing, such as ink-jet or electrostatographic "laser" printing, each round dot represents the placement of an ink droplet or a quantity of toner in a particular desired area. (It is conceivable that the presently-described methods could be adapted to a "write white" electrophotographic system, wherein a modulating laser places dots which correspond to areas intended to remain white, or uncovered by toner, in the final print.) The main difference among patches is not the different number of dots per given area of test patch (patches P2, P3, and P4, for example, all include the same number of dots), but the different configuration of dots relative to the grid. As described more fully in the patent incorporated by reference, the organization of the grid with the corners thereof aligned over the center of each spot is the key by which variables such as spot size and overlap among neighboring spots can be taken into account in determining the reflectance of particular patch.

FIG. 2 is a series of portions of test patches corresponding exactly to the test patches in FIG. 1, but isolated so that only the spots around one particular square in the grid is shown. In the different views of FIG. 2, what is of interest is only what is within one particular square; the overlap of dots outside the square is shown only to show the relationship of dots relative to the square. The FIG. 1 test patches thus represent a combination of a large number of squares which are individually shown by the corresponding numbers P0–P6 in FIG. 2. In a practical embodiment, the FIG. 1 test patches should have as many squares as necessary for a practical measurement of the reflectance of the test patch, such as by a standard light source and photosensor arrangement. By looking at a relatively large test patch, such as having several thousand such squares in its grid, a reflectance associated with each individual square on the grid, such as shown in FIG. 2, can be derived. In brief, the advantage of the arrangement of test patches shown in FIGS. 1 and 2 is that the seven basic relationships of spots with the grid completely summarize the reflectance properties of a particular digital printer having a particular characteristic dot size and a particular characteristic amount of overlap among neighboring dots.

According to the method of the present invention, a digital printing apparatus which is desired to be calibrated is caused to print out a set of test patches of a desirable size, the set corresponding to the seven types of test patches shown as P0–P7 in FIGS. 1 and 2. As described in the claims herein, these seven test patches P0–P6 will be referred to as "component" test patches, because the microstructure of each test patch, such as shown by the individual squares in the test patches of FIG. 2, represent every relationship of a given number of dots relative to one square of the grid. As will be described in detail below, any type of halftone pattern subsequently generated by the digital printing apparatus can be described as a composite of individual squares of different types P0–P6 as shown in FIG. 2. As described in the patent incorporated by reference, the fact that only seven test patches are required to completely describe the halftoning behavior of a particular digital printing apparatus makes the overall calibration process much more efficient than prior art techniques, which typically involve the making of 256 different test patches to completely describe a digital printing apparatus.

Further according to the method of the present invention, after the seven component test patches P0–P6 are printed on a sheet by the digital printing apparatus, these test patches are then measured for reflectance. This reflectance measurement can be done within the machine or externally, as often as required given a particular digital printing situation: a small desktop machine may require this calibration only once in its lifetime, a mid-volume digital printer may have this calibration performed with every scheduled maintenance, and a high-volume printer may have provision for performing this test patch generation and reflectance measurement performed at every start-up. It is further conceivable that, if it is desired not to have a user see the test patches being made as part of the calibration process, these test patches could merely be made on a photoreceptor surface with the reflectance measurement being made directly on the photoreceptor instead of on a separate print sheet, with the test patches being simply erased from the photoreceptor without every being printed on a sheet.

Once the reflectance of each test patch P0–P6 is measured, the reflectance $r_0, r_1 \ldots r_6$ corresponding to each test patch P0, P1, ... P6 is then converted into a value for the ink area coverage of each test patch. As mentioned in the "Background of the Invention" above, an important subtlety in obtaining precise and accurate halftone is to recognize the difference between the reflectance of a particular area and the total ink area coverage of that area. Once again, whereas reflectance is a psychological effect, a printing apparatus has direct control only over ink area coverage, and these two parameters are not necessarily linearly related.

According to a preferred embodiment of the invention, the relationship between ink area coverage and reflectance of a particular halftone created by a digital printer is established by a function which is ultimately derived from the "Yule-Nielsen" equation. In its basic form, the equation is $$r^{1/n} = (1-a)r_p^{1/n} + ar_i^{1/n}$$

where $r_p$ and $r_i$ are respectively the reflectance of the paper (medium) itself and by the medium completely covered by the ink or toner, a is the covered fraction of a unit area by the ink and r is the resulting reflectance. The parameter n can be considered as wavelength-independent, with its value depending on the optical properties of the medium and the ink, as well as the area concerned. In the most common contexts of digital printing in office equipment using common types of paper, a suitable value of n is not less than 2.0 and not more than 3.0.

Since the printed dots used in obtaining halftones in digital printers are small and their size and shape vary from one point to another, it is difficult to directly measure the value of a the area covered by the ink or toner. However, the measured value of the average reflectance r of a particular test patch can be used to estimate a. According to the method of the present invention, the measured reflectances of each test patch P0–P6 can be inserted into the Yule-Nielsen equation to yield a value of a, the ink coverage, for each test patch, and by extension for each cell in the test patch such as shown as P0–P6 in FIG. 2. This equation for the ink area coverage $a_m$ for a set of test patches P0–P6 with measured reflectances $r_m$ is given by $$a_m = \frac{r_6^{1/n} - r_m^{1/n}}{r_6^{1/n} - r_0^{1/n}}, \quad m = 0, 1, \ldots, 6$$

Once again, in a typical digital printer context, the value of n is typically not less than 2.0 and not more than 3.0. Using the above equation, by merely plugging in the actual measured reflectance value for each test patch, the value of ink area coverage can be determined for each test patch. It will further be noted that the value of $r_6$, the actual reflectance of test patch P6 in FIG. 1 represents the bare sheet or medium with no ink or toner thereon, and $r_0$, corresponding to test patch P0, should preferably represent an area with complete ink or toner coverage or at the very least, a test patch in which every corner in the grid is occupied by a dot.

Once the value of $a_m$, the ink area coverage for each component test patch P0–P6, is obtained, these values can be used to determine the expected reflectance of any halftone area, such as an image desired to be printed, subsequently created by the digital printer.

The use of these derived values of ink area coverage a for each component test patch can be exploited when particular halftone techniques are used in an image. In the following discussion, there will first be discussed how these values of a derived according to the method of the present invention can be used in the context of a "halftone-screen" halftoning technique.

FIGS. 3A–3D are a series of views of a small portion (30 pixels) of a halftone image made according to a halftone-screen halftoning method, showing how the method of the present invention can be applied. FIG. 3A is a representation of a halftone screen which is used to derive an arrangement of dots in response to an input of a particular halftone for the 30-pixel area. As is known in the art, a halftone screen such as shown in FIG. 3A is effectively a spatial arrangement of threshold values, typically on a scale from 0 (full black) to 255 (full white). Each pixel area in the mask is given a particular value from 0 to 255, and when a particular halftone reflectance (for example, 150 on a scale from 0 to 255) is submitted to the mask, these values act as thresholds, and a spot will be placed in the particular pixel area if the halftone value is less (i.e., darker) than the threshold value in the pixel area.

FIG. 3B is a representation of dots placed by a digital printing apparatus in response to a halftone value of 150 applied to each of the pixel areas of the mask shown in FIG. 3A. It is apparent that for every pixel area in the mask of FIG. 3A having a threshold value less than 150, a dot has been placed by the halftoning algorithm in that particular pixel area. For example, in the top left corner pixel area the mask value is 75, and as this value is less than 150, a dot has been placed there. However, for the pixel area just below the top left pixel area in FIG. 3A, having a threshold value of 180, this pixel area does not have a dot, because the threshold value of 180 exceeds the desired brightness value of 150. Similarly, the cumulative effect of placing dots as shown in FIG. 3B should in a larger context over many thousands of pixel areas, obtain a desired halftone effect.

FIG. 3C shows the exact same configuration of dots as in FIG. 3B, but the grid shown in FIG. 3B has been moved slightly so that the corners of the squares in the grid are now aligned over the centers of the dots. This placement of the grid relative to the dots will cause each square on the grid to correspond to one particular cell of a component test patch, such as shown in FIG. 2 described above. FIG. 3B is a rendering of the spots in FIG. 3C, only that each square on the grid is now assigned a value of its equivalent among the component test patch cells in FIG. 2. For example, the top left pixel area in FIG. 3D is recognized as being identical to the cell of test patch P4 as shown in FIG. 2, while the pixel area just below that can be seen as being a cell corresponding to the test patch P5. In this way, any halftone area regardless of what halftoning technique was used to obtain it, can be understood as a composite of different types of cells as shown in FIG. 2.

Recognizing each cell in FIG. 3D as belonging to one cell of each component test patch, the arrangement of dots shown in FIG. 3B or 3C can be parsed and understood as a composite of these cells. (The cells in the illustrated sample of pixels may be affected by dots in adjacent pixel areas which are not illustrated, but these adjacent pixel areas will be ignored for now.) An analysis of the cells in FIG. 3D show 0 cells of the type P0 (referring to FIG. 2); 2 cells of type P1; 2 cells of the type P2; 2 cells of the type P3; 5 cells of the type P4; 13 cells of the type P5; and 6 cells of the type P6.

These summed values of ink area coverage $a_0, a_1, \ldots a_6$ can then be used to determine an average ink area coverage $a_{area}$ for the whole small area of the image under consideration:

$$a_{area} = \frac{N_{P0a0} + N_{P1a1} + \ldots N_{P6a6}}{N_{area}}$$

where $N_{P0}$, $N_{P1}$, etc., represent the number of pixel areas (cells) of a particular component type, and $N_{area}$ is the total number of cells in the small area desired to have a particular halftone. The result $a_{area}$, will represent the average area coverage per cell for the area of the image of the desired halftone.

This calculated average ink area coverage $a_{area}$ can then be used to calculate the reflectance $r_{area}$ of the area having the desired halftone, by simply inserting $a_{area}$ into an equation which is the reverse of the basic Yule-Nielsen equation given above, solving for $r_{area}$, the reflectance of the area of the desired halftone:

$$r_{area} = [(1 - a_{area})r_6^{1/n} + a r_0^{1/n}]^n$$

This calculated value of $r_{area}$ can be used, for example, as a "check" to determine whether the particular halftoning algorithm or technique will yield a small area of the desired reflectance, and can thus be used to amend the algorithm or technique so that the halftone area of the desired reflectance is achieved. Basically, this technique of converting the ink area coverage values of the component cells to a reflectance is useful for calibrating a digital printing apparatus, either the hardware or the software thereof. With reference to the U.S. Pat. No. 5,469,267 incorporated by reference above, the above-described steps of printing test patches, measuring the actual reflectance of the test patches, and then calculating an expected reflectance of an area given a halftoning technique, can be incorporated in steps 101, 102, and 103 of the illustrated embodiment of the patent incorporated by reference.

The technique of the present invention, described above in the context of a halftone-screen halftoning technique, can also be used with an error diffusion halftoning technique. The article referenced above, of which the present inventor is a co-author, gives a basic description of how the basic technique of centering dots at the corners of a grid can be used in conjunction with error diffusion halftoning (but without the Yule-Nielsen equation to clairfy the difference between ink area coverage and reflectance). An error diffusion halftoning technique can be considered as generally similar to a halftone-screen technique, except that the decision whether to put a dot in a particular pixel area represented by a square in the grid is made on a running basis, one pixel area at a time. Thus, in brief, whether or not a dot is chosen to be placed in a particular candidate pixel area will effect the type of component cell (P0–P6) which will be placed in a particular small area which is to have a desired halftone. Thus, as candidate pixel areas are filtered through an algorithm whether to be given a dot or not, the neighborhood of pixel areas around the pixel area desired to have a particular halftone will have one or another value of $a_{area}$, depending on whether the candidate pixel area in the neighborhood is given a dot or not. The above-described technique can then be used to calibrate the algorithms in an error-diffusion halftoning system.

While the invention has been described with reference to the structure disclosed, it is not confined to the details set forth, but is intended to cover such modifications or changes as may come within the scope of the following claims.

We claim:

1. A method of calibrating a digital printer, comprising the steps of:

causing the digital printer to print a set of component test patches on a medium, each component test patch representing a unique repetitive pattern of dots relative to a grid;

measuring a reflectance of each component test patch;

deriving a relationship between a measured reflectance of each component test patch and an area of ink coverage of each component test patch;

creating image data operative of the digital printer to create a halftone area of a desired reflectance according to a halftone technique;

parsing the image data creating the halftone area as a composite of small areas, each small area being associated with a component test patch;

determining a reflectance associated with the halftone area based on summing a derived area of ink coverage of each small area forming the halftone area.

2. The method of claim 1, the deriving step including establishing a relationship between a measured reflectance of each component test patch and an area of ink coverage of each component test patch through a Yule-Nielsen equation.

3. The method of claim 2, wherein the Yule-Nielsen equation has an n not less than 2.0 and not more than 3.0.

4. The method of claim 1, each of the set of component test patches comprising a pattern of dots having a unique relationship with a grid, with the grid defining lines forming intersections which are centered on the dots.

5. The method of claim 1, the set of test patches consisting of seven test patches, including one test patch representative of zero ink coverage on the sheet and one test patch representative of maximum ink coverage on the sheet.

6. The method of claim 1, wherein the halftone technique is a halftone screen technique.

7. The method of claim 1, wherein the halftone technique is an error-diffusion technique.

* * * * *